Figure 1:
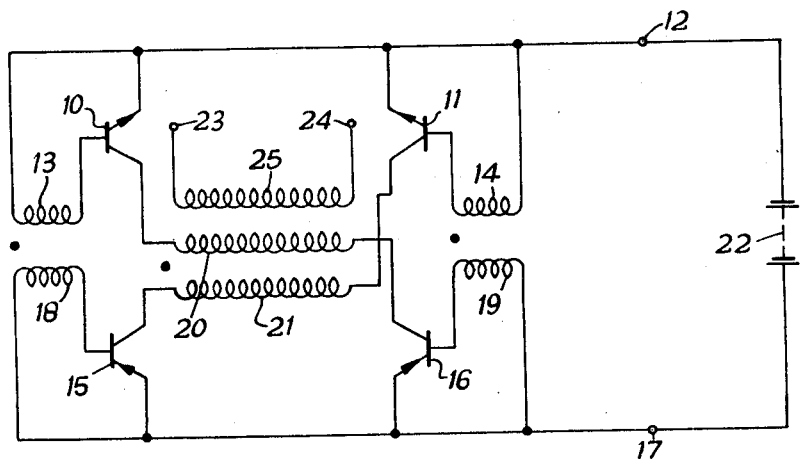

April 17, 1962　　G. L. FOUGERE ET AL　　3,030,590
ELECTRIC POWER CONVERTERS

Filed Sept. 26, 1958　　2 Sheets-Sheet 1

INVENTORS
GUY LLOYD FOUGERE
WILLIAM LESLIE BRENDLING
BY
ATTORNEY

INVENTORS
GUY LLOYD FOUGERE
WILLIAM LESLIE BRENDLING
BY
ATTORNEY

United States Patent Office 3,030,590
Patented Apr. 17, 1962

3,030,590
ELECTRIC POWER CONVERTERS
Guy Lloyd Fougere and William Leslie Brendling, London, England, assignors to Sylvania-Thorn Colour Television Laboratories Limited, London, England
Filed Sept. 26, 1958, Ser. No. 763,717
9 Claims. (Cl. 331—113)

The present invention relates to electric power converters and is concerned with circuits for connection to a source of steady potential and adapted to provide an alternating output potential. Such circuits are used when a source of alternating potential is required and only a source of steady potential, such as a battery, is available or when a large steady potential is required and only a small steady potential is available. In the latter circumstances the alternating output potential is arranged to be of suitably large amplitude by means of the transformer effect and this potential is rectified and smoothed to provide a large steady potential.

For high powers, rotary converters are used to convert a steady potential to an alternating potential, but for low powers, in the range between a few milliwatts and about two kilowatts, circuits embodying transistors have been devised, which circuits can be operated with efficiencies of the order of 90%. Such efficiencies cannot be achieved using rotating machinery.

Thus a circuit is described in Proceedings of the Institute of Radio Engineers, January 1955, page 99, in which two p-n-p transistors have their emitters connected to earth, their bases connected to earth through two subsidiary secondary windings of a transformer respectively and their collectors connected together through the primary winding of the transformer. The negative terminal of a battery is connected to a centre tap of the primary winding and the positive terminal of the battery is earthed. The subsidiary secondary windings are such that the feedback which they provide maintains the circuit in oscillation. Hence an alternating output is provided in the main secondary winding of the transformer.

High efficiencies are attained by operating the transistors as switches. Thus during the oscillations each transistor is alternately bottomed and cut off, the cut-off occurring when the core of the transformer reaches saturation, there then being no further increase in the magnetic flux through the windings of the transformer. Hence the signal in the feedback winding decays rapidly and the transistor cuts off. The frequency of the oscillations in the circuit is determined mainly by the characteristics of the transformer, particularly those of the core material.

It is a disadvantage of transistors that there is a limit to the voltage that may be applied between the emitter and collector electrodes. In the circuit described the collector potential of each transistor swings between a potential substantially that of the emitter, that is earth, and a potential of magnitude twice that supplied by the battery. Accordingly if, for example, the emitter-collector voltage rating is 24 volts, a battery supplying a potential greater than 12 volts cannot be used. Since the maximum power that can be supplied by the circuit is determined by the battery voltage multiplied by the collector current in the bottomed state, a circuit capable of switching a battery voltage equal to the emitter-collector voltage rating would constitute an improvement over the described circuit and it is an object of this invention to provide such an improved circuit.

According to the present invention in one of its aspects there is provided an electric power converter comprising a circuit having two input terminals for connection to a source of potential, one terminal being connected to the emitter electrodes and base electrodes of two n-p-n type transistors and the second terminal being connected to the emitter electrodes and base electrodes of two p-n-p type transistors, the collector electrodes of one of the n-p-n type transistors and one of the p-n-p type transistors being connected together and through the primary winding of a transformer to the collector electrodes of the other two transistors, the connections of either the emitter electrodes or the base electrodes of the transistors to the said terminals being made through four subsidiary secondary windings respectively of the transformer, and the connections of the windings of the transformer and the characteristics of the transistors being such that, with a suitable source of potential connected across its input terminals the circuit maintains oscillations and thereby provides an alternating output potential in the main secondary winding of the transformer.

According to the present invention in another of its aspects there is provided an electric power converter comprising a circuit having two input terminals for connection to a source of potential, one terminal being connected to the emitter electrodes and base electrodes of two n-p-n type transistors and the second terminal being connected to the emitter electrodes and base electrodes of two p-n-p type transistors, the collector electrode of one of the n-p-n type transistors being connected to the collector electrode of one of the p-n-p type transistors through a first primary winding of a transformer, the collector electrode of the other n-p-n type transistor being connected to the collector electrode of the other p-n-p type transistor through a second primary winding of the transformer, the connections of either the emitter electrodes or the base electrodes of the transistors to the said terminals being made through four subsidiary secondary windings respectively of the transformer, and the connections of the windings of the transformer and the characteristics of the transistors being such that, with a suitable source of potential connected across its input terminals the circuit maintains oscillations and thereby provides an alternating output potential in the main secondary winding of the transformer.

In a power converter according to the invention in the said one of its aspects the characteristics of the four transistors need to be fairly closely matched to achieve satisfactory operation. In a power converter according to the invention in the said other of its aspects the characteristics of the transistors may differ from one another quite considerably.

In these power converters the potential applied across the said two terminals can be made equal to the emitter-collector peak rating of the transistors and hence for a given type of transistor the power obtainable is substantially double that obtainable with the known circuit described.

In order to facilitate D.C. isolation, it is preferred to connect the subsidiary secondary windings between the base electrodes and the said terminals rather than between the emitter electrodes and the terminals.

It is an advantage of the invention that standard biasing techniques for ensuring thermal stability of the transistors may readily be applied, and these techniques may be employed to determine the conditions—class B, class AB or class A—under which the circuit operates. In the case when the collector electrodes of two pairs of transistors are connected together, one heat sink may be employed for each pair of transistors.

Figure 2:
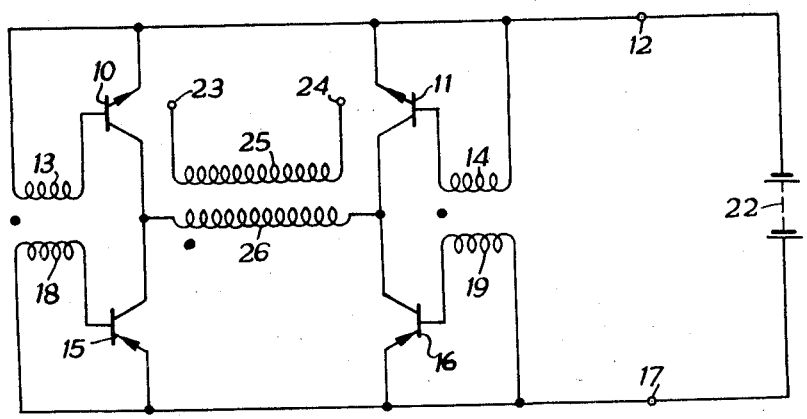
Figure 3:
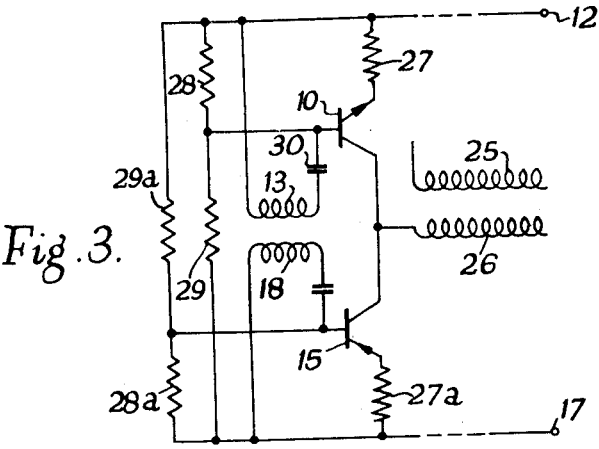
Figure 4:
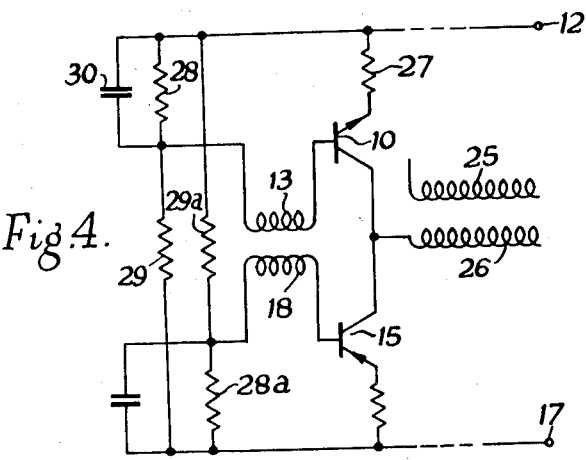

The invention will now be described by way of example with reference to the accompanying drawings, in which:
  FIGS. 1 and 2 are circuit diagrams of two embodiments of the invention, and
  FIGS. 3 and 4 are circuit diagrams showing two ways in which stability of the transistors shown in FIGS. 1 and 2 may be achieved.

Referring to FIG. 1, two n-p-n type transistors 10 and 11 have their emitter electrodes connected directly to a first input terminal 12 and their base electrodes connected to the first input terminal through two subsidiary secondary windings 13 and 14 respectively of a transformer. Two p-n-p type transistors 15 and 16 have their emitter electrodes connected directly to a second input terminal 17 and their base electrodes connected to the second input terminal through two further subsidiary secondary windings 18 and 19 respectively of the transformer.

The collector electrode of the n-p-n type transistor 10 is connected to the collector electrode of the p-n-p type transistor 16 through a first primary winding 20 of the transformer and the collector electrodes of the other two transistors 11 and 15 are connected together through a second primary winding 21 of the transformer. In use, a battery 22 is connected to the input terminals with its positive terminal connected to the input terminal 17. A load is connected between output terminals 23 and 24 connected to a main secondary winding 25 of the transformer.

The arrangement of the windings of the transformer is such that the circuit maintains oscillations and thereby supplies an alternating potential to the load. Thus when the end of the primary winding 20 or 21 marked with a dot is positive with respect to the other end, the ends of the windings 13, 14, 18 and 19 marked with dots are positive with respect to the other ends of these windings.

In the circuit shown in FIG. 2 the two primary windings 20 and 21 of the transformer are replaced by a single primary winding 26 which has one end connected to the collector electrodes of the transistors 10 and 15 and the other end connected to the collector electrodes of the transistors 11 and 16. In this circuit four transistors with closely matched characteristics are chosen. It will be appreciated that with this arrangement the collectors of the transistors 10 and 15 can be provided with a common heat sink, as can the collectors of the transistors 11 and 16.

The alternative biasing arrangements shown in FIGS. 3 and 4 will now be described. In these figures only a portion of a complete circuit is shown, the transistors 11 and 16 being omitted. The biasing arrangements for the latter transistors are in each case the same as for the transistors 10 and 15. The biasing arrangements are shown as applied to the circuit shown in FIG. 2.

In FIG. 3 the emitter of the transistor 10 is biased by means of a resistor 27 between the emitter and the terminal 12, and the base is biased by connecting it to the junction of two resistors 28 and 29 connected in series between the terminals 12 and 17 and thus forming a potential divider chain. A blocking capacitor 30 is inserted in the connection of the base to the winding 13. Similar connections are shown for the transistor 15.

Slightly modified arrangements are shown in FIG. 4, the base of the transistor 10 being connected to the junction of the resistors 28 and 29 not directly but through the winding 13. Accordingly the capacitor 30 is here placed in parallel with the resistor 28 to function as a by-pass capacitor.

It will be appreciated that the biasing arrangements described with respect to FIGS. 3 and 4 can also be applied to the circuit shown in FIG. 1.

The purpose of the circuit of FIG. 1 is to produce an alternating voltage across the output winding 25. This is accomplished by using the transistors 10, 11 and 15, 16 as switches which are periodically opened and closed. More particularly, the circuit is so arranged that when transistors 10 and 16 are conducting, transistors 15 and 11 are non-conductive, and further, when transistors 16 and 10 are conducting, transistors 11 and 15 are cut off.

When the D.C. voltage for battery 22 is first applied across the remainder of the circuit, the left hand ends of all of the transformer windings 13, 14, 18, 19, 20, 21, 25 are rendered positive with respect to the right hand ends. Transistors 15 and 11 begin to conduct, and current flows through winding 21. The regenerative action of windings 18 and 14 causes transistors 15 and 11 to conduct more heavily. This process continues until the transformer windings are saturated. (While the transistors 15 and 11 are conducting more heavily, the voltages induced across the windings 13, 20 and 14 are such as to maintain transistors 10 and 16 in the non-conductive state.) However, when the transformer windings 18, 19 and 21 are saturated, the impedance level changes abruptly from a high to a low value, and transistors 15 and 11 begin to conduct less heavily. Due to the coupling of the various transformer windings, this reduction in conduction triggers transistors 10 and 16 into the conductive state. The paths of current flow are then such that transistors 10 and 16 conduct more heavily and, at the same time, transistors 15 and 11 are cut off. The net result is that the desired alternating voltage appears across the winding 25.

In this connection it is to be noted that when any of the transistor pairs 15, 11 and 10, 16 are cut off, the following situation occurs. Assuming, for example, that transistors 10 and 16 are cut off, then the battery voltage is applied across transistors 10 and 16 in series and at the same time, due to the coupling of windings 21 and 20, a voltage equal to the battery voltage appears across winding 20. This voltage is in series with the battery voltage 22, so that effectively twice the battery voltage appears across the series connected transistors 10 and 16. Stated differently, under these conditions a voltage equal to the battery voltage is applied across each transistor. The same analysis holds true when transistors 10 and 16 are conductive and transistors 15 and 11 are non-conductive.

The circuit of FIG. 2 functions in the same manner as that of FIG. 1, except that in FIG. 2 the two primary windings 20 and 21 are merged into a common winding 26.

As has been explained previously, the circuits of FIGS. 3 and 4 illustrate various means of biasing the various transistors so as to permit the characteristics of each transistor to be less closely matched than is required by the circuits of FIGS. 1 and 2. As is well known this type of bias permits the use of different transistors of the same general type but having slightly different electric characteristics.

We claim:

1. A power converter comprising first and second input terminals for connection to a source of potential, first and second p-n-p type transistors, first and second n-p-n type transistors, each said transistor having an emitter, a collector and a base electrode, a transformer having a primary system including at least one primary winding and a secondary system including an output secondary winding and four subsidiary secondary windings, pairs of connections between said emitter and base electrodes of said first and second p-n-p type transistors respectively and said first input terminal, one of each of said pairs of connections including a respective one of said subsidiary secondary windings, pairs of connections between said emitter and base electrodes of said first and second n-p-n type transistors respectively and said second input terminal, one of each of the last said pairs of connections including a respective one of said subsidiary secondary windings, a connection including a primary winding of said primary system between said collector electrodes of said first p-n-p type transistor and said first n-p-n type transistor and a connection including a primary winding of said primary system between said collector electrodes of said second p-n-p type transistor and said second n-p-n type transistor.

2. A power converter comprising first and second input terminals for connection to a source of potential, first and second p-n-p type transistors, first and second n-p-n type transistors, each said transistor having an emitter, a collector and a base electrode, a transformer having a primary winding, an output secondary winding and four subsidiary secondary windings, connecting means between said emitter electrodes of said p-n-p type transistors and said first input terminal, said base electrodes of said p-n-p type transistors being connected to said first input terminal through two of said subsidiary windings respectively, connecting means between said emitter electrodes of said n-p-n type transistors and said second input terminal, said base electrodes of said n-p-n type transistors being connected to said second input terminal through the other two of said subsidiary windings respectively, said collector electrodes of said first p-n-p type transistor and said second n-p-n type transistor being connected together and through said primary winding to said collector electrodes of said second p-n-p type transistor and said first n-p-n type transistor.

3. A power converter according to claim 2, further comprising two heat sinks provided at the two pairs of connected collector electrodes respectively.

4. A power converter according to claim 2, wherein each transistor is provided with biasing means including a resistor in its emitter lead and a potential divider chain connected between the two input terminals for biasing the base electrode.

5. A power converter according to claim 4, wherein each transistor has its base electrode connected directly to a point in said potential divider chain, said converter comprising four blocking capacitors connected in series with said subsidiary windings respectively.

6. A power converter according to claim 4, comprising four by-pass capacitors and wherein each transistor has its base electrode connected through said subsidiary secondary winding to a point in said potential divider chain, said point being connected to one of said input terminals through one of said by-pass capacitors.

7. A power converter comprising first and second input terminals for connection to a source of potential, first and second p-n-p type transistors, first and second n-p-n type transistors, each said transistor having an emitter, a collector and a base electrode, a transformer having two primary windings, an output secondary winding and four subsidiary secondary windings, connecting means between said emitter electrodes of said p-n-p type transistors and said first input terminal, said base electrodes of said p-n-p type transistors being connected to said first input terminal through two of said subsidiary windings respectively, connecting means between said emitter electrodes of said n-p-n type transistors and said second input terminal, said base electrodes of said n-p-n type transistors being connected to said second input terminal through the other two of said subsidiary windings respectively, said first p-n-p and n-p-n type transistors having their collector electrodes connected together through one of said primary windings and said second p-n-p and n-p-n type transistors having their collector electrodes connected together through the other of said primary windings.

8. A power converter comprising first and second input terminals for connection to a source of potential, first and second p-n-p type transistors, first and second n-p-n type transistors, each said transistor having an emitter, a collector and a base electrode, a transformer having a primary winding, an output secondary winding and four subsidiary secondary windings, connecting means between said base electrodes of said p-n-p type transistors and said first input terminal, said emitter electrodes of said p-n-p type transistors being connected to said first input terminal through two of said subsidiary windings respectively, connecting means between said base electrodes of said n-p-n type transistors and said second input terminal, said emitter electrodes of said n-p-n type transistors being connected to said second input terminal through the other two of said subsidiary windings respectively, said collector electrodes of said first p-n-p type transistor and said second n-p-n type transistor being connected together and through said primary winding to said collector electrodes of said second p-n-p type transistor and said first n-p-n type transistor.

9. A power converter comprising first and second input terminals for connection to a source of potential, first and second p-n-p type transistors, first and second n-p-n type transistors, each said transistor having an emitter, a collector and a base electrode, a transformer having two primary windings, an output secondary winding and four subsidiary secondary windings, connecting means between said base electrodes of said p-n-p type transistors and said first input terminal, said emitter electrodes of said p-n-p type transistors being connected to said first input terminal through two of said subsidiary windings respectively, connecting means between said base electrodes of said n-p-n type transistors and said second input terminal, said emitter electrodes of said n-p-n type transistors being connected to said second input terminal through the other two of said subsidiary windings respectively, said first p-n-p and n-p-n type transistors having their collector electrodes connected together through one of said primary windings and said second p-n-p and n-p-n type transistors having their collector electrodes connected together through the other of said primary windings.

References Cited in the file of this patent

UNITED STATES PATENTS

| | | |
|---|---|---|
| 2,798,160 | Bruck et al. | July 2, 1957 |
| 2,821,639 | Bright et al. | Jan. 28, 1958 |
| 2,872,582 | Norton | Feb. 3, 1959 |